United States Patent
Feng et al.

(10) Patent No.: US 9,967,718 B2
(45) Date of Patent: May 8, 2018

(54) AGGREGATING AND SEGREGATING MULTIPLE DIGITAL VEHICULAR REPEATERS AUTOMATICALLY

(71) Applicant: MOTOROLA SOLUTIONS, INC., Schaumburg, IL (US)

(72) Inventors: Wen Feng, Sichuan (CN); Dajun Chen, Sichuan (CN); Xun Fei, Sichuan (CN); Yahui Gong, Sichuan (CN); Yong Tian, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/105,518

(22) PCT Filed: Apr. 24, 2015

(86) PCT No.: PCT/CN2015/077414
§ 371 (c)(1),
(2) Date: Jun. 16, 2016

(87) PCT Pub. No.: WO2016/169057
PCT Pub. Date: Oct. 27, 2016

(65) Prior Publication Data
US 2017/0142559 A1    May 18, 2017

(51) Int. Cl.
*H04W 4/08*    (2009.01)
*H04W 72/04*    (2009.01)
(Continued)

(52) U.S. Cl.
CPC .......... *H04W 4/08* (2013.01); *H04W 72/048* (2013.01); *H04W 76/005* (2013.01); *H04W 84/005* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 5,857,144 A * | 1/1999 | Mangum | H04W 84/08 455/11.1 |
| 6,785,511 B1 * | 8/2004 | Hengeveld | H04B 7/2606 455/16 |

(Continued)

FOREIGN PATENT DOCUMENTS

| CN | 202261827 | 5/2012 |
|---|---|---|
| CN | 102802127 | 11/2012 |

(Continued)

OTHER PUBLICATIONS

PCT/CN2015/077414 International Search Report and Written Opinion dated Feb. 3, 2016 (11 pages).

(Continued)

*Primary Examiner* — Candal Elpenord
(74) *Attorney, Agent, or Firm* — Michael Best & Friedrich LLP

(57) ABSTRACT

Aggregating and segregating multiple digital vehicular repeaters. One exemplary method includes the steps of assigning a first serving digital vehicular repeater from a plurality of digital vehicular repeaters; receiving, via the first serving digital vehicular repeater, a first call request from a first portable subscriber unit; assigning the first call to a first channel; moving the first serving digital vehicular repeater and the first portable subscriber unit to the first channel; and assigning a second serving digital vehicular repeater from the plurality of digital vehicular repeaters.

11 Claims, 7 Drawing Sheets

(51) Int. Cl.
    *H04W 76/00*    (2009.01)
    *H04W 84/00*    (2009.01)
    *H04W 88/04*    (2009.01)

(56)          References Cited

U.S. PATENT DOCUMENTS 7,711,319    B2      5/2010    Namm et al.
    7,711,383    B2      5/2010    Namm et al.
    2007/0270097 A1 *   11/2007    Namm ................. H04B 7/2606
                                                                455/11.1
    2008/0207241 A1 *    8/2008    Namm .................... H04W 4/08
                                                                 455/518
    2014/0112242 A1      4/2014    Vilmur et al.
    2015/0103700 A1      4/2015    Yeh

FOREIGN PATENT DOCUMENTS

CN          103002501           3/2013
    WO          2014066007           5/2014
    WO          2014104900           7/2014

OTHER PUBLICATIONS

First Office Action from the Australian Intellectual Property Office for Application No. 2015392469 dated Dec. 7, 2017 (5 pages).

* cited by examiner

AGGREGATING AND SEGREGATING MULTIPLE DIGITAL VEHICULAR REPEATERS AUTOMATICALLY

BACKGROUND OF THE INVENTION

Portable subscriber units (PSUs), for example, two-way radios, are often used by law enforcement, fire and medical services, and others to provide voice and data communications in a mobile communications network. Portable subscriber units may, for example, be set to a single channel which provides a path for voice and data communications to be transmitted to and received from other radios that are operating on the same channel.

Repeaters are commonly used in mobile communication networks to provide coverage to portable subscriber units in geographical areas where the coverage provided by one or more fixed infrastructure (e.g., a base station) is insufficient. One type of repeater is a digital vehicular repeater (DVR), which (as its name implies) is typically mounted within a vehicle that can travel among different geographic locations. Portable subscriber units within proximity of a vehicle in which a DVR is incorporated can communicate with one another on a single channel provided by the DVR.

A DVR typically includes a radio and a repeater. The radio provides radio communication to fixed network equipment, such as a base station, and the repeater interfaces with one or more portable subscriber units on a conventional channel for supporting talk groups. A talk group is an assigned group of personal subscriber units that share a channel. Personal subscriber units in a talk group can communicate with each other over the channel.

Multiple portable subscriber units can use a single DVR for creating a talk group if the portable subscriber units are all on the same channel. However, the radio can only support one channel of communication at a time, and hence, only one talk group at a time. Accordingly, portable subscriber units must be on the same channel to communicate with one another when communicating through a DVR.

Multiple DVRs can be deployed to a common site. In some implementations, one of the DVRs is designated as a master device, and the other DVRs are designated as slave devices to repeat radio communications. Because each DVR is only capable of providing one physical communication channel, multiple DVRs, configured in such an arrangement, can only support one talk group at a time.

Having a single master DVR may result in having a single failure point. If there is a failure, error, or interruption with the master DVR, then all portable subscriber units may lose service until the problem is resolved.

Accordingly, there is a need for a system and method of aggregating and segregating multiple digital vehicular repeater system automatically.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
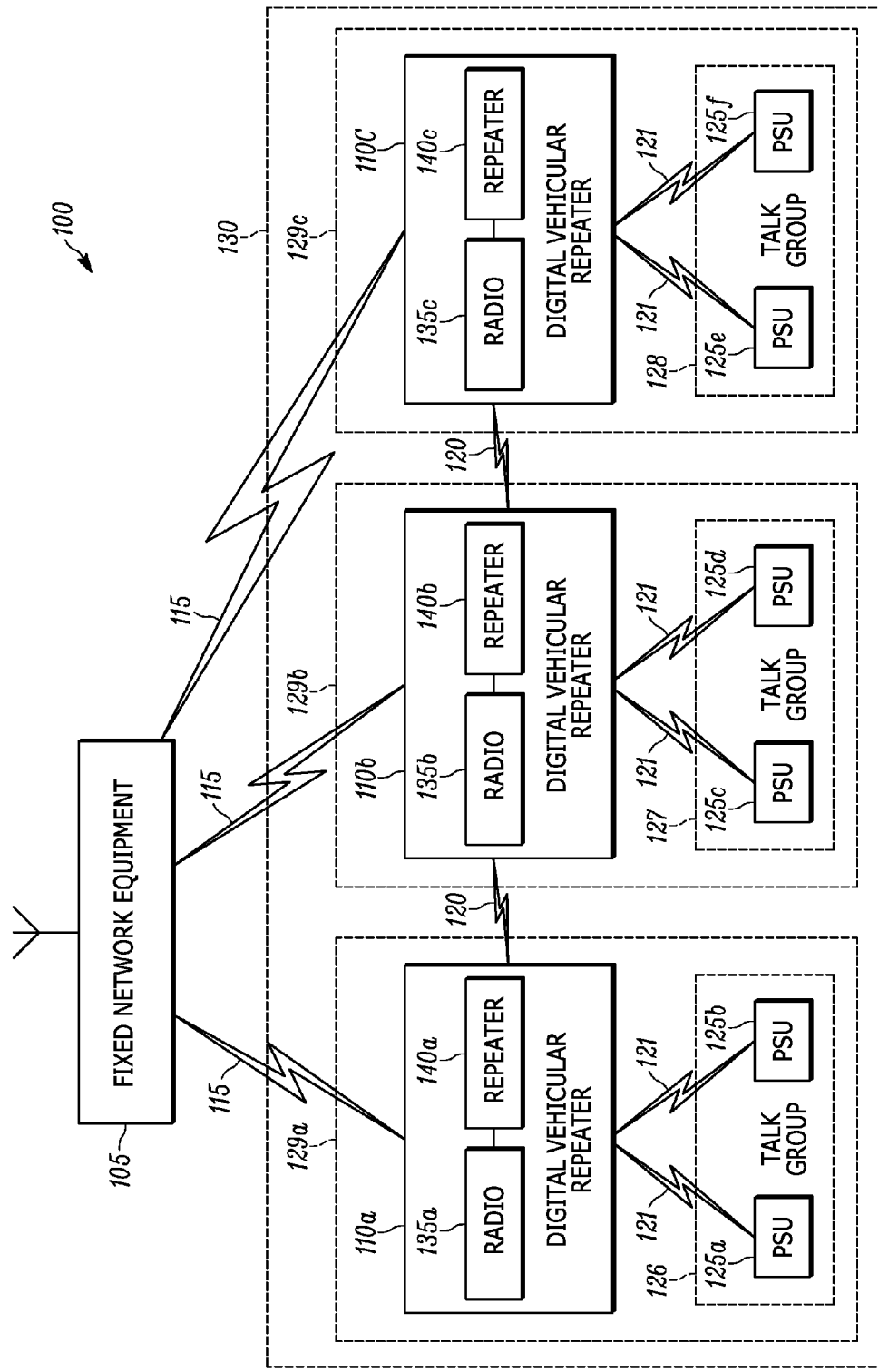
FIG. 1 is a block diagram of a mobile communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one embodiment, a method is provided of aggregating and segregating multiple digital vehicular repeaters. The method includes assigning a first serving digital vehicular repeater from a plurality of digital vehicular repeaters; receiving, via the first serving digital vehicular repeater, a first call request from a first portable subscriber unit; assigning the first call to a first channel; moving the first serving digital vehicular repeater and the first portable subscriber unit to the first channel; and assigning a second serving digital vehicular repeater from the plurality of digital vehicular repeaters.

In another embodiment, a method is provided of serving a call using digital vehicular repeaters. The method includes receiving a call request from a portable subscriber unit; assigning a channel; outputting a call grant signal; moving to the assigned channel; and managing a call from the portable subscriber unit.

FIG. 1 is a block diagram illustrating a mobile communication network 100 for providing wireless communication. The mobile communication network 100 may include fixed network equipment 105, such as a base station. The mobile communication network 100 may, for example, be implemented in accordance with Project 25 (P 25) or other two-way radio communications protocols and standards. The fixed network equipment 105 may be communicatively coupled to one or more digital vehicular repeaters (DVRs), for example DVRs 110a-110c. The fixed network equipment 105 is communicatively coupled to the DVRs 110a-110c via first radio frequency links 115. The DVRs 110a-110c may also be communicatively coupled to each other via second radio frequency links 120.

The DVRs 110a-110c extend a coverage area of the fixed network equipment 105 to one or more portable subscriber units 125a-125f via third radio frequency links 121. A portable subscriber unit may be, but is not limited to, a hand-held radio, a vehicle-mounted radio, a dispatch radio, or another wireless communication device compatible with the protocol or standard of the mobile communication network 100. Each portable subscriber unit 125a-125f may include a transmitting antenna and a receiving antenna, or alternatively, a transceiving antenna. In some embodiments, the fixed network equipment 105 provides radio communication through one of the first radio frequency links 115 to the one or more DVRs 110a-110c, which allows the portable subscriber units 125a-125f in one talk group (for example, one of the talk groups 126, 127, or 128) to communicate with portable subscriber units in other talk groups through the DVRs 110a-110c via the first radio frequency links 115 and the second radio frequency links 121.

In one example of operation, DVR 110a provides radio communication to portable subscriber unit 125a and portable subscriber unit 125b in talk group 126. DVR 110b provides radio communication to portable subscriber unit 125c and portable subscriber unit 125d in talk group 127. Similarly, DVR 110c provides radio communication to portable subscriber unit 125e and portable subscriber unit 125f in talk group 128. Other embodiments of the invention may include, more or less DVRs, portable subscriber units, and/or talk groups. In some embodiments, each of the DVRs 110a-110c is mounted in a vehicle, for example, a police car, an ambulance, or a fire truck.

The extended coverage area provided by DVRs 110a-110c allows users of portable subscriber units 125a-125f to move freely within a vicinity 130 of the DVRs 110a-110c. The vicinity 130 is a region, or area, in which the DVRs 110a-110c can transmit and receive radio communication signals to and from at least one of the portable subscriber units 125a-125f. The portable subscriber units 125a-125f can also communicate directly with one another, and with other devices such as, hand-held two-way radios. Each DVR 110a, 110b, and 110c can provide talk group support to a plurality of portable subscriber units 125a-125f in a coverage area 129a, 129b, or 129c of the DVR 110a, 110b, or 110c. Voice and data communication between portable subscriber units 125a-125f spanning two or more DVRs 110a-110c over wider areas than the vicinity 130, can be provided over the first radio frequency links 115.

In some embodiments, each DVR 110a-110c includes a radio (often referred to as a mobile subscriber unit (MSU)) 135a-135c. Each DVR 110a-110c also includes a repeater (often referred to as a vehicular repeater (VR)) 140a-140c. In some embodiments, the radios 135a-135c are configured to provide radio communication with the fixed network equipment 105 over the radio frequency link 115. The radios 135a-135c are communicatively coupled to the corresponding vehicular repeaters 140a-140c within each DVR 110a-110c. The vehicular repeaters 140a-140c enhance the communication signal of a communication channel to the portable subscriber units 125a-125f. For example, in some embodiments, vehicular repeater 140a enhances the communication signal of a first communication channel to portable subscriber units 125a and 125b. Vehicular repeater 140b enhances the communication signal of a second communication channel to portable subscriber units 125c and 125d. Vehicular repeater 140c enhances the communication signal of a third communication channel to portable subscriber units 125e and 125f.

In some embodiments, the portable subscriber units 125a-125f communicate with one another over the first radio frequency links 115. The portable subscriber units 125a-125f may communicate with a corresponding DVR 110a, 110b, or 110c over one or more channels within a frequency band of the radio frequency link 115, but using only one band at a time. For example, portable subscriber units 125a, 125b in the coverage area 129a of DVR 110a can use a first channel for talk group 126. Portable subscriber units 125c, 125d in the coverage area 129b of DVR 110b can use a second channel for talk group 127. It will be appreciated by one of ordinary skill in the art that a channel can be defined as a specific radio frequency, or band of frequencies, usually described in conjunction with a predetermined letter, number, or codeword.

The mobile communication network 100 is configured to dynamically manage a plurality of DVRs (e.g., DVRs 110a-110c) in a vicinity (e.g., vicinity 130), as well as dynamically manage a plurality of traffic channels. In one embodiment, the mobile communication network 100 implements a trunking system to dynamically support a plurality of call requests from a plurality of portable subscriber units (e.g., portable subscriber units 125a-125f).

Figure 2:
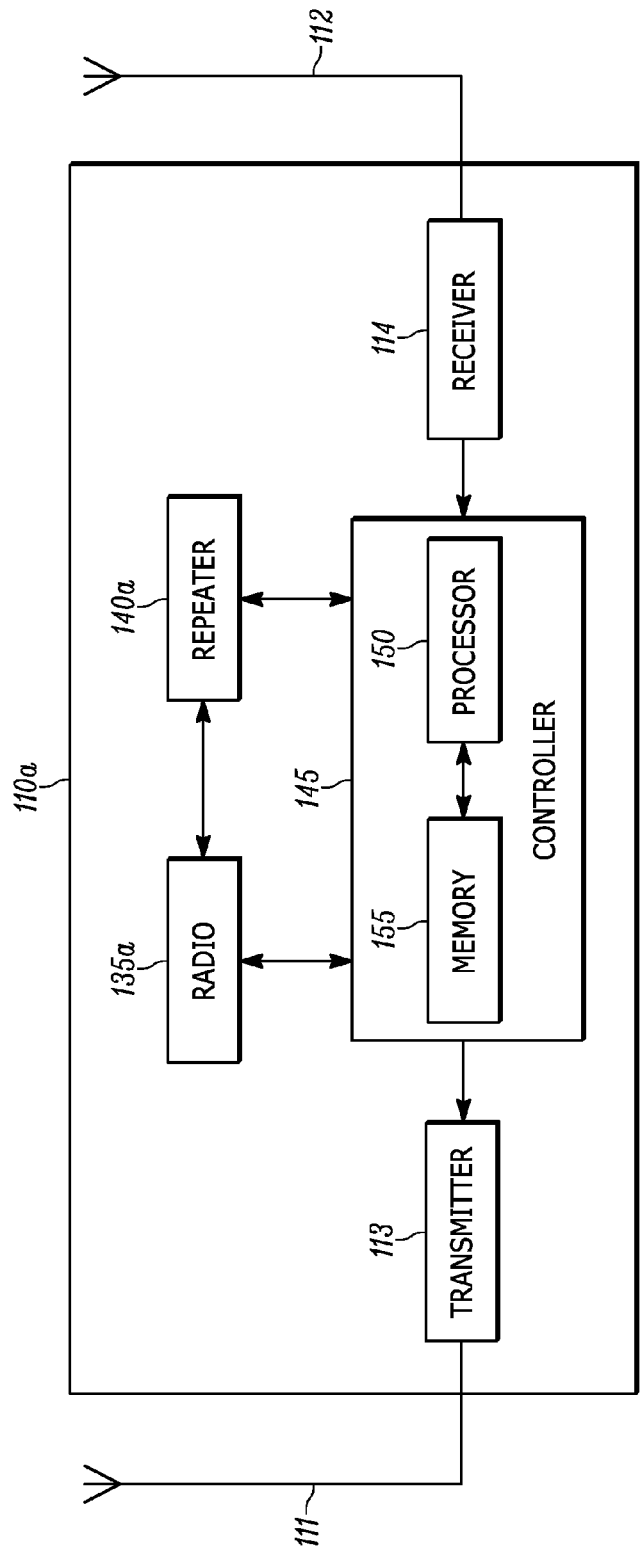
FIG. 2 is a block diagram of a digital vehicular repeater in accordance with some embodiments.

FIG. 2 illustrates a block diagram of one embodiment of DVR 110a. In some embodiments, DVRs 110b, 110c have a similar construction as DVR 110a. DVR 110a includes a transmitting antenna 111, a receiving antenna 112, a transmitter 113, a receiver 114, radio 135a, repeater 140a, and controller 145. In other embodiments, rather than including separate transmitting and receiving components, the DVR 110a may include components that perform multiple functions, for example, a transceiver and a transceiving antenna. The controller 145 is electrically and/or communicatively connected to a variety of modules or components of the DVR 110a. For example, the illustrated controller 145 is connected to the transmitter 113, the receiver 114, the radio unit 135a, and the repeater 140a. The controller 145 includes combinations of hardware and software that are operable to, among other things, control the operation of the DVR 110a.

In some embodiments, the controller 145 includes a plurality of electrical and electronic components that provide power, operational control, and protection to the components and modules within the controller 145 and/or the DVR 110a. For example, the controller 145 includes, among other things, a processor 150 (e.g., a microprocessor, or another suitable programmable device) and a memory 155.

The memory 155 includes, for example, a program storage area and a data storage area. The program storage area and the data storage area can include combinations of different types of memory, such as read-only memory (ROM), random access memory (RAM) (e.g., dynamic RAM [DRAM], synchronous DRAM [SDRAM], etc.), electrically erasable programmable read-only memory (EEPROM), flash memory, a hard disk, an Secure Digital (SD) card, or other suitable magnetic, optical, physical, or electronic memory devices. The processor 150 is connected to the memory 155 and executes software instructions that are capable of being stored in a RAM of the memory 155 (e.g., during execution), a ROM of the memory 155 (e.g., on a generally permanent basis), or another non-transitory computer readable medium such as another memory or a disc. Software included in the implementation of the DVR 110a can be stored in the memory 155 of the controller 145. The software includes, for example, firmware, one or more applications, program data, filters, rules, one or more program modules, and other executable instructions. The controller 145 is configured to retrieve from memory and execute, among other things, instructions related to the control processes and methods described herein. In other constructions, the controller 145 includes additional, fewer, or different components.

Figure 3A:
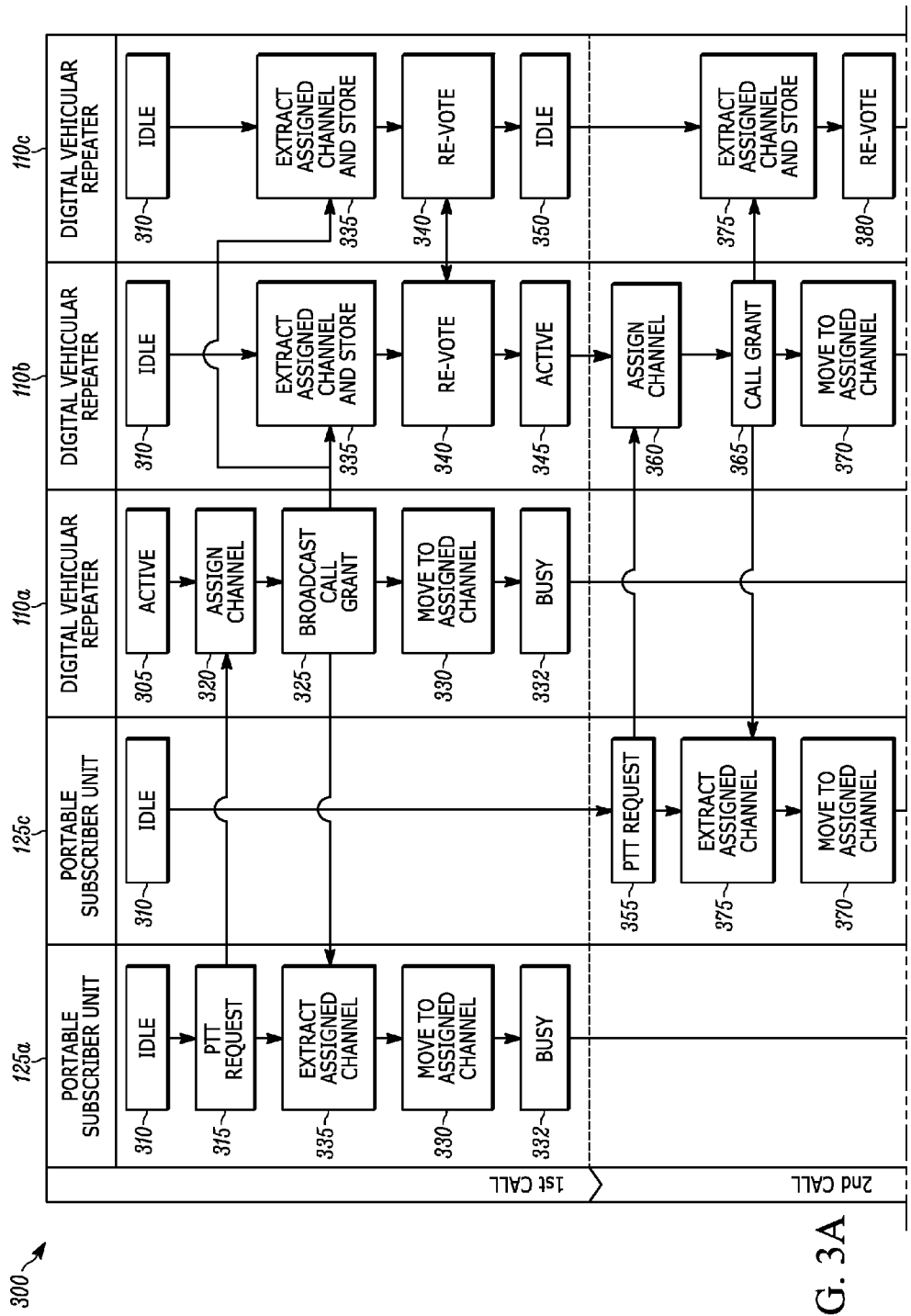
FIGS. 3A and 3B together illustrate an operational flow diagram of a method of managing a plurality of digital vehicular repeaters in accordance with some embodiments.
Figure 3B:
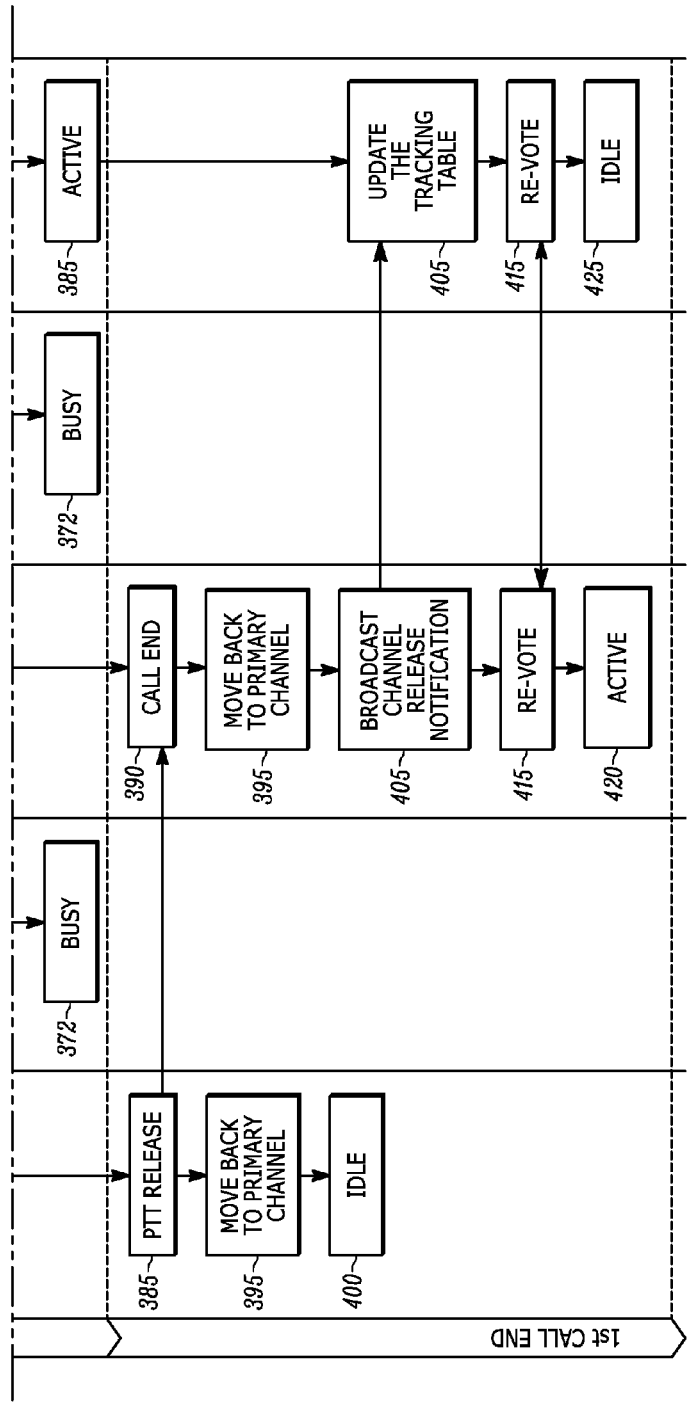

FIGS. 3A and 3B together illustrate a method or operational flow procedure 300 for managing a plurality of DVRs (e.g., DVRs 110a-110c) and a plurality of portable subscriber units (e.g., portable subscriber units 125a-125f)

within a vicinity (e.g., vicinity 130). In the procedure illustrated, the plurality of DVRs includes DVR 110*a,* DVR 110*b,* and DVR 110*c,* although more or less DVRs may be present within the vicinity. Additionally, in the procedure illustrated, the plurality of portable subscriber units include portable subscriber units 125*a,* 125*c,* although more, less, or different portable subscriber units may be present within the vicinity and used in conjunction with the procedure 300. Initially, DVR 110*a* is active as a serving DVR (Block 305), while the remaining DVRs (DVR 110*b* and DVR 110*c*) and the personal subscriber units (personal subscriber units 125*a,* 125*c*) in the vicinity remain idle (Block 310). While acting as the serving DVR, DVR 110*a* waits on a primary channel in order to receive a call request, for example, a push-to-talk (PTT) request from a portable subscriber unit, such as portable subscriber unit 125*a* (Block 315). Once a call request comes in, the serving DVR (DVR 110*a*) assigns a channel from a plurality of available traffic channels (Block 320). The serving DVR (DVR 110*a*) outputs, or broadcasts, a call grant signal on the primary channel to the idle DVRs (DVR 110*b* and DVR 110*c*) (Block 325). In some embodiments, the call grant signal includes the assigned channel (e.g., a frequency). The serving DVR (DVR 110*a*), along with the requesting portable subscriber unit (in this example, portable subscriber unit 125*a*) and one or more target portable subscriber units (for example, one of the other portable subscriber units 125*b*-125*f*), move to the assigned traffic channel to start the call (Block 330). Once the serving DVR (DVR 110*a*) and the one or more target portable subscriber units (portable subscriber unit 125*a*) move to the assigned traffic channel they are busy (Block 332).

Once the idle DVRs (DVR 110*b* and DVR 110*c*) and the target portable subscriber unit (portable subscriber unit 125*a*) receive the call grant signal from the current serving DVR (DVR 110*a*), the idle DVRs (DVR 110*b* and DVR 110*c*) and the target portable subscriber unit (portable subscriber unit 125*a*) extract the assigned channel and store the information into memory (e.g., a non-transitory computer-readable memory located within one or more of the DVRs (e.g., DVRs 110*a*-110*c*) or the fixed network equipment 105) (Block 335). The idle DVRs (DVR 110*b* and DVR 110*c*) note the assigned channel to ensure that the channel is not assigned to two overlapping call requests.

A vote, or re-vote, occurs among the idle DVRs (DVR 110*b* and DVR 110*c*) (Block 340), and a new serving DVR is assigned to be active, for example DVR 110*b,* to handle the next call request (Block 345). The remaining idle DVRs (DVR 110*c*) remain idle (Block 350). In one embodiment, the serving DVR voting is based on time of arrival. In such an embodiment, the serving DVR is determined based on time of arrival to the vicinity 130. In another embodiment, the serving DVR voting is based on signal strength. In such an embodiment, the signal strength of each DVR (e.g., DVRs 110*a*-110*c*) is measured and the DVR with the strongest signal strength is voted the serving DVR. In some embodiments, the voting procedure occurs on one or more controllers 145 of the DVRs 110*a*-110*c,* using, for example, software stored in memory 155 and performed by the processor 150 of one or more of the controllers 145 of the DVRs 110*a*-110*c*. In other embodiments, the voting procedure occurs at the fixed network equipment 105, using, for example, software stored on the fixed network equipment 105. In some embodiments, the voting procedure also takes place at the onset of the procedure 300.

Once voted as the serving DVR, DVR 110*b* waits on the primary channel in order to receive a second call request from a portable subscriber unit (e.g., a second PTT request from a second portable subscriber unit, for example, portable subscriber unit 125*c*) (Block 355). Once the second call request is received, the serving DVR (now DVR 110*b*) assigns a new channel from the plurality of remaining traffic channels (Block 360). The serving DVR (DVR 110*b*) outputs a call grant signal (including the assigned traffic channel) to the idle DVRs (DVR 110*c*) (Block 365). The serving DVR (DVR 110*b*), along with the requesting portable subscriber unit (portable subscriber unit 125*c*) and one or more target portable subscriber units (for example, one of the other portable subscriber units 125*a,* 125*b,* and 125*d*-125*f*), move to the assigned traffic channel to start the second call (Block 370). Once the serving DVR (DVR 110*b*) and the one or more target portable subscriber units (portable subscriber unit 125*c*) move to the assigned traffic channel they are busy (Block 372).

Once the idle DVRs (DVR 110*c*) and the new target personal subscriber unit (personal subscriber unit 125*c*) receive the call grant signal from the current serving DVR (DVR 110*b*), the idle DVRs (DVR 110*c*) and the new target personal subscriber unit (personal subscriber unit 125*c*) extract the assigned traffic channel and store the information into memory (Block 375). A re-vote then occurs (Block 380) and a new serving DVR is assigned, for example DVR 110*c,* and becomes active (Block 385) while any remaining DVRs remain idle. In the embodiment of the procedure 300, DVR 110*c* is the last available DVR. In such an embodiment, the single remaining DVR (DVR) will serve all calls itself via the primary channel instead of assigning a new channel. Therefore, in a vicinity 130 having only a single DVR, or only a single DVR remaining, the single remaining DVR will serve all calls on the primary channel instead of assigning a channel from the plurality of available traffic channels.

To end a call, the target portable subscriber unit (portable subscriber unit 125*a*) will output a push-to-talk (PTT) release signal (Block 385). Once the first call has ended (Block 390), DVR 110*a,* along with the portable subscriber units (in this example, portable subscriber unit 125*a*) on the first assigned channel, move back to the primary channel (Block 395). The portable subscriber unit (portable subscriber unit 125*a*) then once again becomes idle (Block 400).

The DVR 110*a* outputs a channel release signal, on the primary channel, to the idle DVRs (Block 405) and the idle DVRs (DVR 110*c*) updates a tracking table (Block 410). Another re-vote then occurs (Block 415) and a new serving DVR is assigned. In the illustrated embodiment, DVR 110*a* once again becomes the serving DVR and is active (Block 420) while DVR 110*c* once again becomes idle (Block 425). However, in other embodiments, DVR 110*c,* or a new DVR in the vicinity 130 may be voted the serving DVR.

Figure 4A:
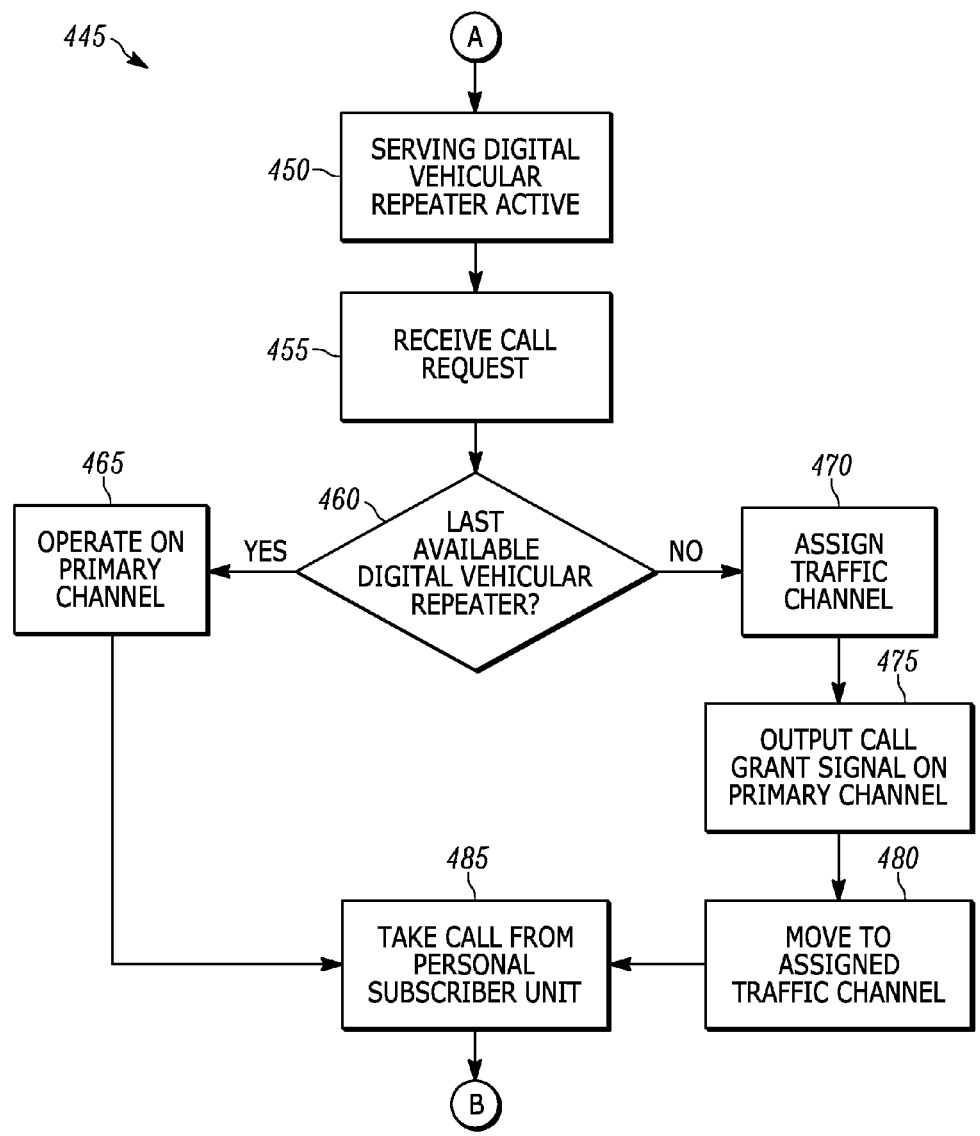
FIGS. 4A and 4B together illustrate a flowchart of a method of a serving digital vehicular repeater serving a call in accordance with some embodiments.
Figure 4B:
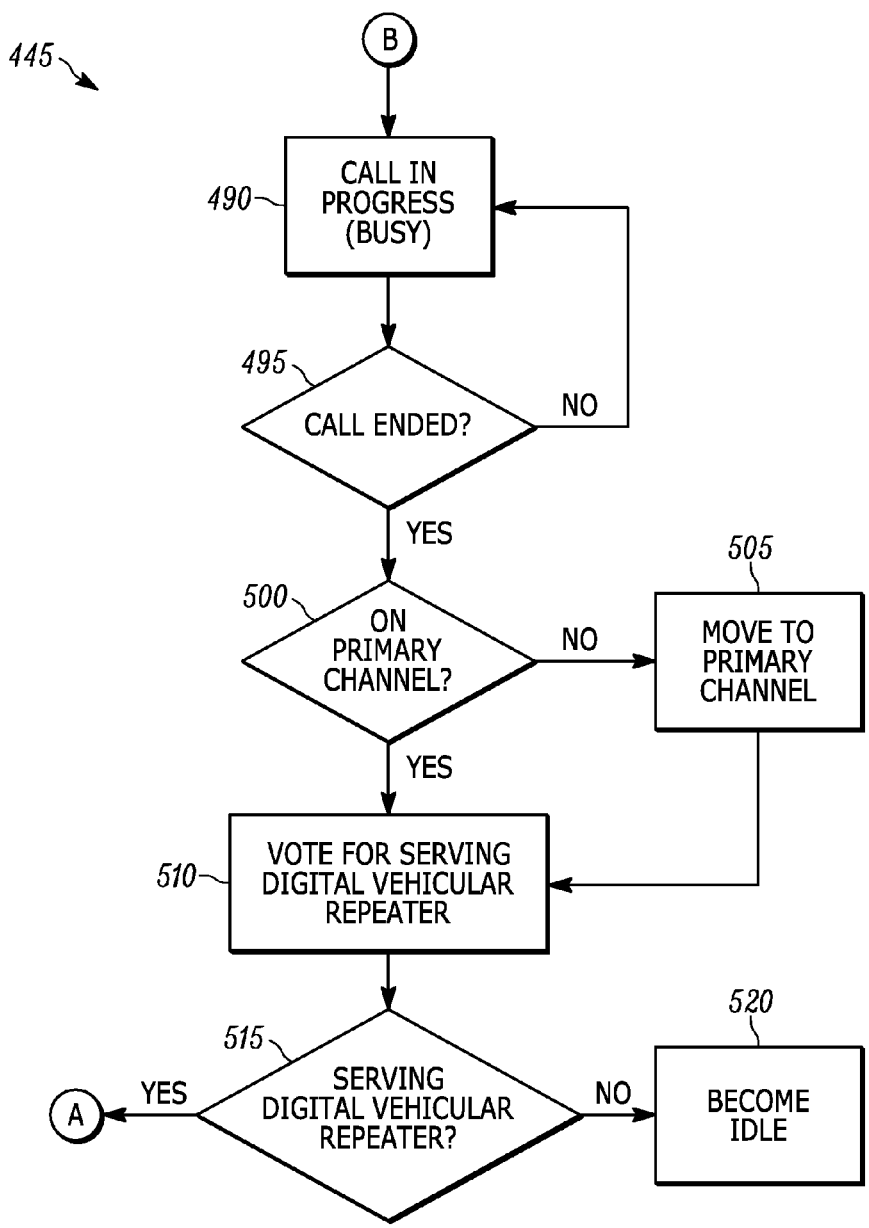

FIGS. 4A and 4B together illustrate a method 445 for a serving DVR to serve a call. The method 445 begins with the serving DVR being active (Step 450) (FIG. 4A). The serving DVR receives a call request from a portable subscriber unit (Step 455). The serving DVR determines if it is the last available DVR within the vicinity 130 (Step 460). When the serving DVR is the last available DVR, the serving DVR operates on the primary channel (Step 465) and then proceeds to Step 485 to take the call from the requesting portable subscriber unit.

When the serving DVR is not the last available DVR, the serving DVR assigns a new channel (e.g., assigns a channel from the plurality of available traffic channels) for the call request (Step 470). The serving DVR outputs a call grant signal on the primary channel to the other DVRs and the portable subscriber units (Step 475). As discussed above, in some embodiments, the call grant signal includes the assigned channel (e.g., the assigned traffic channel or the primary channel). The serving DVR, along with the requesting portable subscriber unit and one or more target portable subscriber units, move to the assigned channel (Step 480). The serving DVR then takes the call from the requesting portable subscriber unit (Step 485).

As is illustrated in FIG. 4B, the call is then in progress and the serving DVR is busy (i.e., engaged in the call) (Step 490). A determination is then made as to whether the call has ended (Step 495). When the call has not ended, method 445 reverts back to Step 490. When the call has ended, a determination is made as to whether the serving DVR is currently on the primary channel (Step 500). When the serving DVR is not currently on the primary channel, the serving DVR moves to the primary channel (Step 505) before proceeding to Step 510. When the serving DVR is currently on the primary channel in Step 500, method 445 proceeds directly to Step 510. A vote for the serving DVR is then performed (Step 510). A determination is made as to whether the current serving DVR is voted as the new serving DVR (Step 515). When the current serving DVR is as acting as the new serving DVR, method 445 returns to Step 450 and the serving DVR remains active. When the current serving DVR is the new serving DVR, the DVR becomes idle (Step 520).

Figure 5:
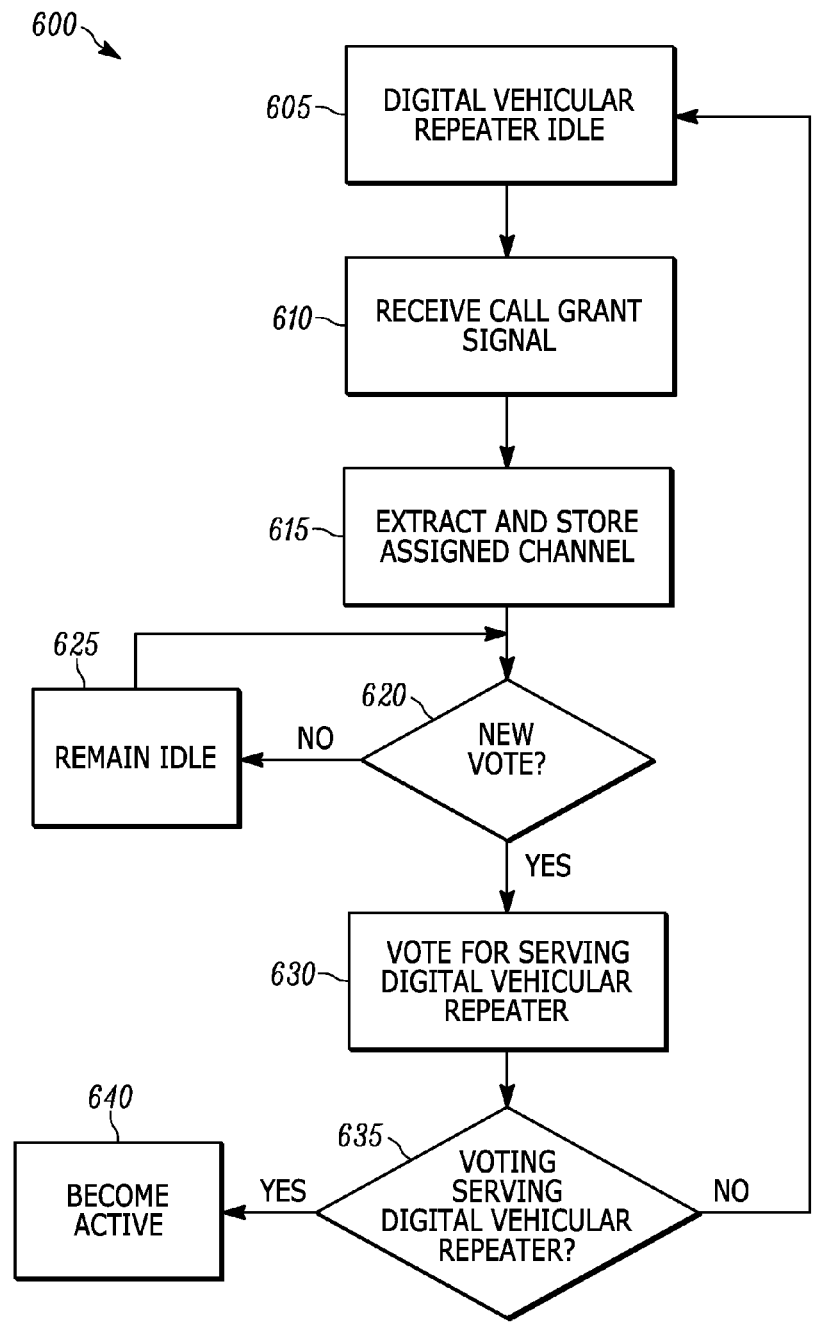
FIG. 5 is a flowchart of a method of a non-serving digital vehicular repeater system receiving a call grant signal in accordance with some embodiments.

FIG. 5 illustrates a method 600 for a non-serving, or idle, DVR to receive a call grant signal. Method 600 begins with the DVR being idle (Step 605). The idle DVR receives a call grant signal from the serving DVR (Step 610). The idle DVR extracts the assigned channel from the call grant signal and stores the assigned channel in memory (Step 615). A determination of whether a new vote is needed (in particular, a new serving DVR vote) is made (Step 620). When a vote is not needed, the DVR remains idle (Step 625) and then returns to Step 620. When a vote is needed, the vote for a new serving DVR is performed (Step 630). A determination is then made whether the currently idle DVR has been voted as the new serving DVR (Step 635). When the currently idle DVR has been voted the new serving DVR, the DVR becomes active (Step 640). When the DVR has not been voted the new serving DVR, the method 600 returns to Step 605 and remains idle.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of aggregating and segregating multiple digital vehicular repeaters, the method comprising:
   assigning a first serving digital vehicular repeater from a plurality of digital vehicular repeaters;
   receiving, via the first serving digital vehicular repeater, a first call request from a first portable subscriber unit;
   assigning the first call to a first channel;
   moving the first serving digital vehicular repeater and the first portable subscriber unit to the first channel; and
   assigning a second serving digital vehicular repeater from the plurality of digital vehicular repeaters;
   receiving, via the second serving digital vehicular repeater, a second call request from a second portable subscriber unit;
   assigning, via the second serving digital vehicular repeater, the second call to a second channel; and
   moving the second serving digital vehicular repeater and the second portable subscriber unit to the second channel.

2. The method of claim 1, further comprising assigning a third serving digital vehicular repeater from the plurality of digital vehicular repeaters.

3. The method of claim 1, further comprising outputting, via the first serving digital vehicular repeater, a call grant signal.

4. The method of claim 3, wherein the call grant signal includes the assigned first channel.

5. The method of claim 1, wherein the second serving digital vehicular repeater is assigned according to a voting process.

6. The method of claim 5, wherein the voting process includes a determination of signal strength.

7. The method of claim 5, wherein the voting process includes a determination of time of arrival within a vicinity.

8. The method of claim 1, wherein the plurality of digital vehicular repeaters remain idle after a serving digital vehicular repeater is assigned.

9. The method of claim 1, further comprising storing the first channel.

10. The method of claim 1, wherein the first call request uses the first channel.

11. The method of claim 1, wherein the first channel and the second channel are different.

\* \* \* \* \*